US007275084B2

(12) United States Patent
Paul (10) Patent No.: US 7,275,084 B2
(45) Date of Patent: Sep. 25, 2007

(54) METHOD, SYSTEM, AND PROGRAM FOR MANAGING ACCESS TO A DEVICE

(75) Inventor: Stephen D. Paul, Superior, CO (US)

(73) Assignee: Sun Microsystems, Inc., Menlo Park, CA (US)

( * ) Notice: Subject to any disclaimer, the term of this patent is extended or adjusted under 35 U.S.C. 154(b) by 591 days.

(21) Appl. No.: 10/156,977

(22) Filed: May 28, 2002

(65) Prior Publication Data

US 2003/0236930 A1 Dec. 25, 2003

(51) Int. Cl.
*G06F 15/167* (2006.01)
*G06F 15/16* (2006.01)
*G06F 3/00* (2006.01)

(52) U.S. Cl. .......................... 709/212; 709/217; 710/38

(58) Field of Classification Search ................ 709/201, 709/203, 223, 229, 239, 246, 212, 217, 225; 710/8, 15, 36, 37, 38
See application file for complete search history.

(56) References Cited

U.S. PATENT DOCUMENTS

| | | | | |
|---|---|---|---|---|
| 6,381,674 B2 * | 4/2002 | DeKoning et al. | .......... | 711/113 |
| 6,434,519 B1 * | 8/2002 | Manjunath et al. | ......... | 704/205 |
| 6,457,098 B1 * | 9/2002 | DeKoning et al. | .......... | 711/114 |
| 6,490,659 B1 * | 12/2002 | McKean et al. | ............ | 711/141 |
| 6,587,082 B1 * | 7/2003 | Moore | ........................ | 345/1.3 |
| 6,594,692 B1 * | 7/2003 | Reisman | ..................... | 709/219 |
| 6,631,484 B1 * | 10/2003 | Born | .......................... | 710/305 |
| 6,801,954 B1 * | 10/2004 | Rust et al. | ..................... | 710/7 |
| 6,816,945 B2 * | 11/2004 | Harris et al. | ................ | 711/135 |
| 2003/0037071 A1 * | 2/2003 | Harris et al. | ................ | 707/200 |

OTHER PUBLICATIONS

U.S. Application entitled "Method, System, and Article of Manufacture for a Firmware Image", filed May 17, 2002, inventors Scott A. Thurston, et al.
U.S. Application entitled "Method, System, and Article of Manufacture for a Firmware Downloads", filed May 17, 2002, inventors Scott A. Thurston, et al.
IBM, "Commands Reference, vol. 2", [online], pp. 1-4. [Retrieved on May 1, 2002]. Retrieved from the Internet at URL: <http://publibn.boulder.ibm.com/doc_link/en_US/a_doc_lib/cmds/aixcmds2/diag.htm>.

(Continued)

*Primary Examiner*—Zarni Maung
*Assistant Examiner*—Sargon N Nano
(74) *Attorney, Agent, or Firm*—Finnegan, Henderson, Farabow, Garrett & Dunner, L.L.P.

(57) ABSTRACT

Provided are a method, system, and program for managing access to a device. An I/O request directed toward the device is received and a determination is made of a device object for the device associated with at least one path object. A determination is made of a queue object associated with the device object, wherein the queue object corresponds to one queue. A determination is made of a queue status from the determined queue object and the I/O request is transmitted on a path indicated in the path object that is associated with the determined device object if the queue status is set to a state indicating to transmit I/O requests.

31 Claims, 7 Drawing Sheets

OTHER PUBLICATIONS

IBM, "Commands Reference, vol. 3", [online], pp. 1-3. [Retrieved on May 1, 2002]. Retrieved from the Internet at URL: <http://publibn.boulder.ibm.com/doc_link/en_US/a_doc_lib/cmds/aixcmds3/lmscode.htm>.

IBM, "Understanding the Diagnostic Subsystem for AIX", [online], pp. 1-30, [Retrieved on May 1, 2002]. Retrieved from the Internet at URL: <http://publibn.boulder.ibm.com/doc_link/en_US/a_doc_lib/aixprggd/diagunsd/ServiceAids . . . >.

* cited by examiner

METHOD, SYSTEM, AND PROGRAM FOR MANAGING ACCESS TO A DEVICE

BACKGROUND OF THE INVENTION

1. Field of the Invention

The present invention relates to a method, system and program for managing access to a device.

2. Description of the Related Art

In prior art multi-pathing systems, multiple paths may connect a host system to a device, such as a storage array, e.g., Redundant Array of Independent Disks (RAID) array, a Direct Access Storage Device (DASD), Just a Bunch of Disks (JBOD), etc. Both the host and the storage device would have multiple ports and/or network adaptors to provide multiple physical paths therebetween.

A host system includes a device driver program to manage Input/Output (I/O) flow to a storage device or any other type of device. If there are multiple paths connecting the host to the storage device, then either the device driver or host operating system would include logic to manage path selection and handle failover to select one available path if the currently used path fails. In prior art failover systems, a queue is provided to hold received I/O requests during the failover operation. When the failover operation completes with a new path configured for use, the host would then process the queued I/O requests that have been pending during the failover process.

There is a continued need in the art for improved techniques and program architectures for managing multiple paths to a device and handling failover operation.

SUMMARY OF THE PREFERRED EMBODIMENTS

Provided are a method, system, and program for managing access to a device. An I/O request directed toward the device is received and a determination is made of a device object for the device associated with at least one path object. A determination is made of a queue object associated with the device object, wherein the queue object corresponds to one queue. A determination is made of a queue status from the determined queue object and the I/O request is transmitted on a path indicated in the path object that is associated with the determined device object if the queue status is set to a state indicating to transmit I/O requests.

In further implementations, the device object comprises one of a plurality of separately addressable subcomponents of a higher level device, and the received I/O request is directed to one of the separately addressable subcomponents of the higher level device.

Still further, one device object is provided for each instance of the device and different queue objects corresponding to different queues are associated with different device objects.

Further provided are a method, system, and program for handling a failover on one of a plurality of paths to a device. A determination is made of a path object for a failed path, wherein one path object is provided for each path to the device. A determination is made of a queue associated with a device object for the device and a queue state is set for the queue to cause any I/O requests directed to the device to be added to the queue. A determination is made of one alternative path object associated with an alternative available path to the device from a plurality of path objects associated with a device object for the device.

In further implementations, the device object is modified to indicate the determined alternative path object and the queue state is set to cause any I/O requests directed to the device to be transmitted to the device.

Still further, the I/O requests added to the queue are processed after modifying the device object to indicate the determined alternative path object.

Described implementations provide an object schema to manage multiple paths to a device and a queue used to queue requests to a device, such that the interrelationship of the objects allows for the association of one or more queues with one or more paths to one or more devices.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations of the present invention. It is understood that other implementations may be utilized and structural and operational changes may be made without departing from the scope of the present invention.

Figure 1:
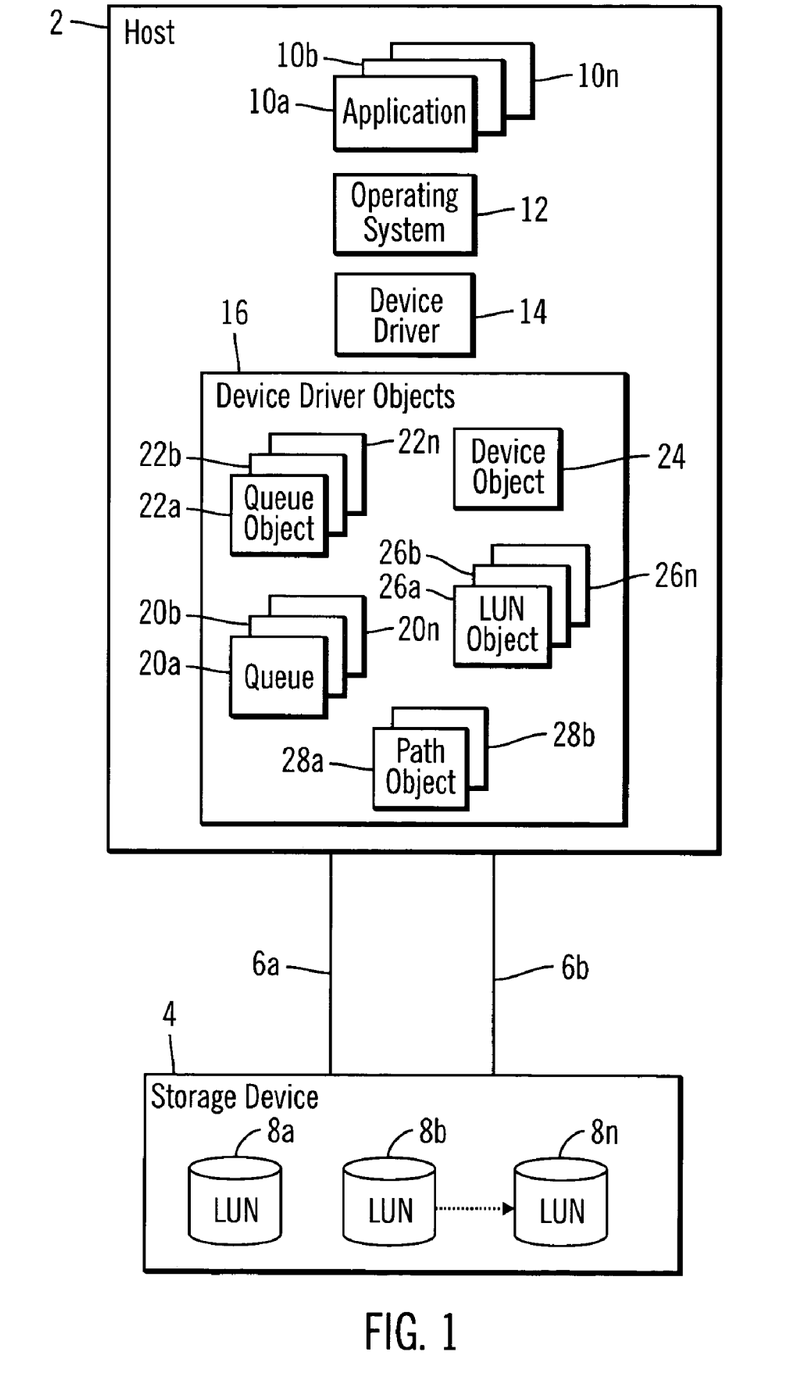
FIG. 1 is a block diagram illustrating a computing environment in which aspects of the invention are implemented.

FIG. 1 illustrates a computing environment in which aspects of the invention are implemented. A host system 2 communicates with a storage device 4 through multiple paths 6a, 6b. The paths 6a, 6a may comprise direct lines or utilize a hub, switch, fabric, etc. that utilize any communication interface technology known in the art, such as Fibre Channel, a parallel or serial connection, TCP/IP, Ethernet, etc. Although only one storage device 4 is shown, the host system 2 may connect via one or more paths to any number of storage devices or other Input/Output (I/O) devices using a same network or different networks. In certain implementations, the storage device 4 includes a plurality of logical devices, also known as logical unit numbers (LUNs) 8a, 8b . . . 8n.

The host 2 includes a plurality of application programs 10a, 10b . . . 10n, which may comprise any application program known in the art, an operating system 12, and a device driver 14. The application programs 10a, 10b . . . 10n would communicate I/O requests to the operating system 12, which in turn would call the device driver 14 to handle communication with the device 4. If the host 2 is connected to different types of devices, then the host may include a separate device driver for each such different device type. In certain implementations, one device driver 14 may handle the connection to multiple instances of a same type of device, where a type of device comprises a particular device from a particular manufacture, and requires a device driver from the manufacture to enable communication with the device type.

The device driver 14 maintains device driver objects 16 to manage the paths and connections to attached devices and LUNs within any of the devices. The device driver objects 16 include one or more queues 20a, 20b ... 20n queuing I/O requests toward one or more devices managed by the device driver 14, one queue object 22a, 22b ... 22n for each queue 20a, 20b ... 20n, one device object 24 for each attached device, and one LUN object 26a, 26a ... 26n for each LUN in a device. If there are multiple devices each having multiple LUNs, then one LUN object would be maintained for each LUN within each of the devices and one device object 24 would be maintained for each attached device. One path object 28a, 28b is maintained for each path 6a, 6a to the device 4. Each queue 20a, 20b ... 20n may queue I/O requests in manner known in the art, such as a First-In-First-Out (FIFO) queuing scheme. In the described implementations, one device object 24 may be generated for each instance of a device type, where a device type may comprise a device that is a particular device model or a class of devices from a specific manufacturer or vendor. There may be one device driver 14 for each device type to manage I/O requests to any instance of the device type.

Figure 2:
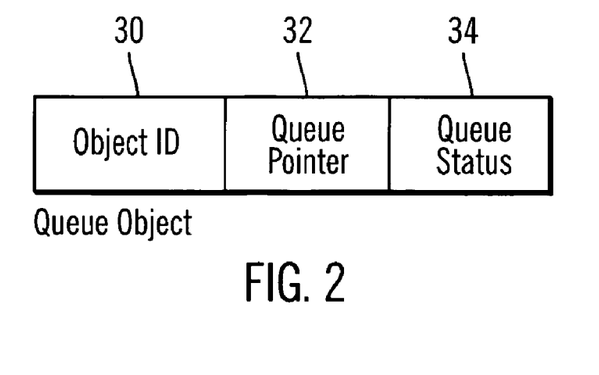
FIGS. 2, 3a, 3b, 4, and 5 illustrate data structures of objects used to manage mutliple paths to devices.

FIG. 2 illustrates information maintained within the queue objects 22a, 22b ... 2n used to manage the queues 20a, 20b ... 20n. The queue objects 22a, 22b ... 22n include an object identifier 30 providing a unique identifier of the queue object, a queue pointer 32 providing a pointer or address of the queue 20a, 20b ... 20n associated with the queue object 22a, 22b ... 22n in memory, and queue status 34. The queue status 34 may indicate one of the following states:

OK: indicates that one path to the device is available and that I/O requests should be transmitted to the device.

STALLED: indicates that I/O requests directed to a device 4 or LUN 8a, 8b ... 8n associated with the queue 20a, 20b ... 20n are to be queued and not transmitted to the target device or LUN.

ABORTING: indicates that all I/Os on the queue 20a, 20b ... 20n are being aborted.

CANCELLING: indicates that a process is removing an I/O request from the queue 20a, 20b ... 20n.

DELETED: indicates that the queue is in the process of being destroyed.

Figure 3A:
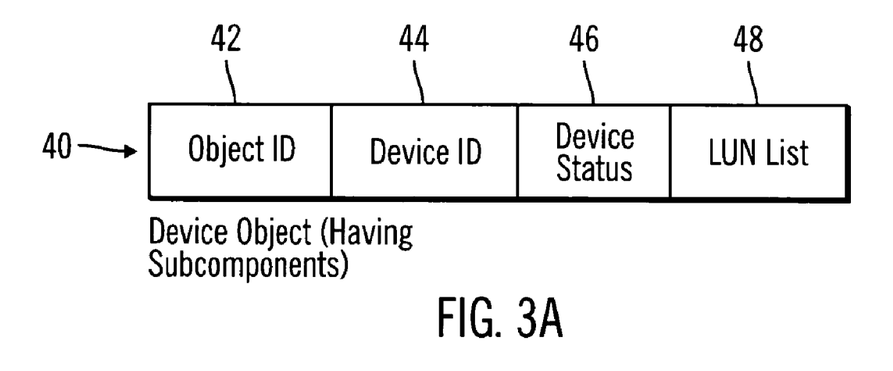

FIG. 3a illustrates information that may be included in a device object 40 for devices having subcomponents, such as the storage device 24 having separate logical devices, such as LUNs 8a, 8b ... 8n. The device object 40 has an object identifier 42 providing a unique object identifier for the object; a device ID 44 that provides information uniquely identifying the device, such as a unique serial number; a device status field 46 indicating an overall status of the device, e.g., available, unavailable, etc.; and a LUN list 48 identifying the LUN objects 26a, 26b ... 26n providing information on the logical devices or LUNs 8a, 8b ... 8n included within the storage device 4. In alternative implementations where the device is not a storage device 4, yet includes separate subcomponents or logical devices that are accessible over separate paths, then the field 48 would include a list of objects for such subcomponents, that would include information similar to that included with the LUN objects 26a, 26b ... 26n.

Figure 3B:
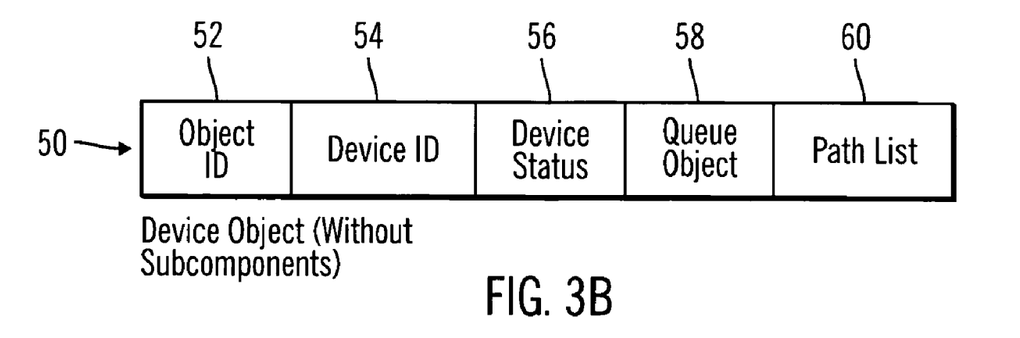

FIG. 3b illustrates information that may be included in a device object 50 for a device that does not have subcomponents. The device object 50 has an object identifier 52 providing a unique object identifier for the device object; a device ID 54 that provides information uniquely identifying the device, such as a unique serial number; a device status field 54 indicating an overall status of the device, e.g., available, unavailable, etc.; a queue object field 58 identifying the queue object 22a, 22b ... 22n for the queue that queues I/O requests to the device; and a path list 60 providing a list of the path objects providing information on the paths connecting to the device.

Figure 4:
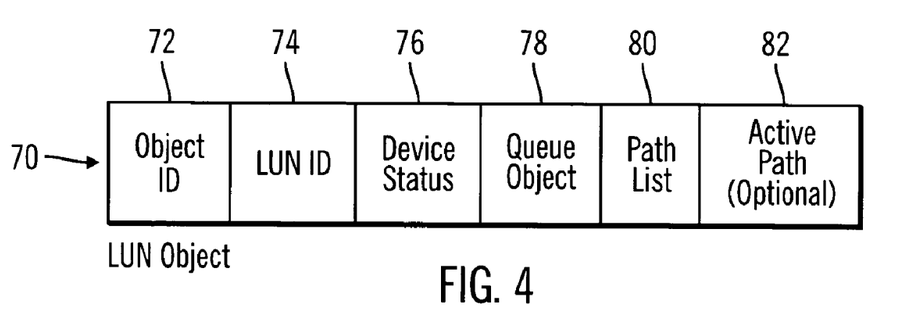

FIG. 4 illustrates information that may be included with the LUN objects 26a, 26a ... 26n. A LUN object 70 includes an object identifier 72 providing a unique object identifier for the object; a LUN ID 74 provides information identifying the LUN, such as the LUN name the application 10a, 10b ... 10n would specify with an I/O request; a device status field 76 indicating an overall status of the device, e.g., available, unavailable, etc.; a queue object field 78 identifying the queue object 22a, 22b ... 22n for the queue that queues I/O requests to the LUN; and a path list 80 providing a list of the path objects providing information on the paths connecting to the device. For devices that may only be accessed on a single path, the LUN object 70 would include an active path field 82 indicating a current path used to access the device. If any of multiple paths may be used to access a device, then any of the available paths may be used. Similarly, the device object 50 for devices without subcomponents may also include an active path field if only one active path may be used to access the device.

Figure 5:
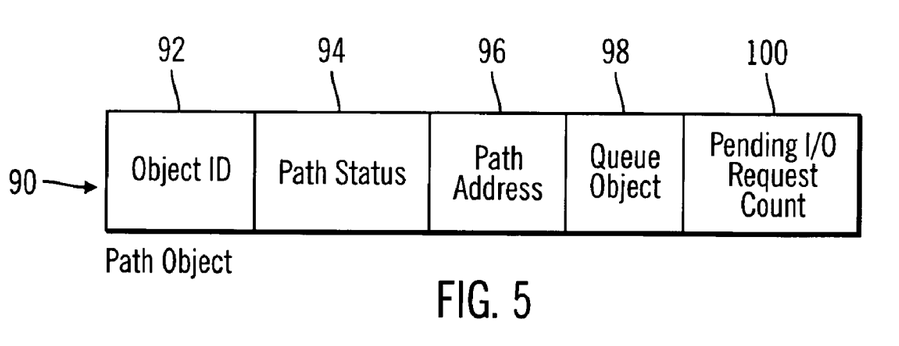

FIG. 5 illustrates information that may be included within the path objects 28a, 28b to provide information on the paths to a device or a logical device or subcomponent therein, such as a LUN. A path object 90 includes an object identifier 92 providing a unique object identifier for the object; a path status field 94 indicating an overall status of the device, e.g., available, unavailable, etc.; a path address field 96 providing information that may be used to address the path, such as a network address, physical address, etc.; a queue object field 98 identifying the queue object 22a, 22b ... 22n for the queue that queues I/O requests to the path; and a pending I/O request count field 100 indicating the number of pending I/O requests on the path 6a, 6b. In certain implementations, the queue object 98 indicated in the path object 90 may be the same queue object 78 indicated in the LUN object on the path associated with the path object.

The described schema allows for a variety of interrelationships of the components. For instance, any number of queues may be provided. If a single queue is provided for a device, then all subcomponents, e.g., LUNs, of a device and all paths to that device may utilize the single queue. If multiple queues are used by a device, then different devices or device subcomponents, e.g., LUNs, in the device may be assigned to different queues. Below are methods or functions that are used to manage the device driver objects 16:

createQueue( ): creates a queue 20a, 20b ... 20n and an associated queue object 22a, 22b ... 22n for the created queue. The queue object 22a, 22b ... 22n would be initialized with a unique identifier in field 30, a queue pointer 32 is set to the address of the queue created in the host memory, and a queue status 34 of OK.

associateObjectToQueue( ): called with a queue object 22a, 22b ... 22n and non-queue object, e.g., device 24, LUN 26a, 26a ... 26n or path 28a, 28b object, to associate the specified object with the specified queue. This operation would update the queue object field 58, 78, 98 in the specified object 50, 70, and 90, respectively, with the identifier of the queue object for the queue that will be used to queue I/O requests to the specified device, LUN, or path.

queueIO( ): is called with parameters of the I/O request and queue object 22a, 22b . . . 22n to queue the specified I/O request on the queue 20a, 20b . . . 20n identified by the specified queue object 22a, 22b . . . 22n.

dequeueIO( ): is called with a queue object 22a, 22b . . . 22n to dequeue an I/O request from the queue 20a, 20b . . . 20n identified in the queue pointer field 32 of the specified queue object 22a, 22b . . . 22n. The I/O request selected for dequeuing would depend on the queuing scheme, e.g., FIFO, Last-in-First-Out (LIFO), etc.

restartQueue( ): is called with a queue object 22a, 22b . . . 22n to initiate processing of all queued I/O requests in the queue 20a, 20b . . . 20n represented by the queue object 22a, 22b . . . 22n specified in the call.

abortQueue( ): called with a queue object 22a, 22b . . . 22n to remove all of the I/O requests on the queue 20a, 20b . . . 20n identified in the queue pointer field 32 of the specified queue object 22a, 22b . . . 22n.

cancelQueue( ): called with an I/O request and queue object 22a, 22b . . . 22n to remove the specified I/O request from the queue 20a, 20b . . . 20n identified in the queue pointer field 32 of the specified queue object 22a, 22b . . . 22n.

setQueueState( ): called with a specified state, e.g., ABORT, OK, STALLED, CANCELLING, DELETED, etc., and a specified queue object 22a, 22b . . . 22n to set the queue status field 34 in the specified queue object 22a, 22b . . . 22n to the specified state.

disassociateObjectFromQueue( ): called with a queue object 22a, 22b . . . 22n and non-queue object, e.g., device 24, LUN 26a, 26a . . . 26n or path 28a, 28b object, to disassociate the specified object with the specified queue. This operation would update the queue object field 58, 78, 98 in the specified object 50, 70, and 98 to remove the identifier of the specified queue object.

destroyQueue( ): called with a queue object 22a, 22b . . . 2n to destroy the specified queue object and queue identified in the queue pointer 32.

Figure 6:
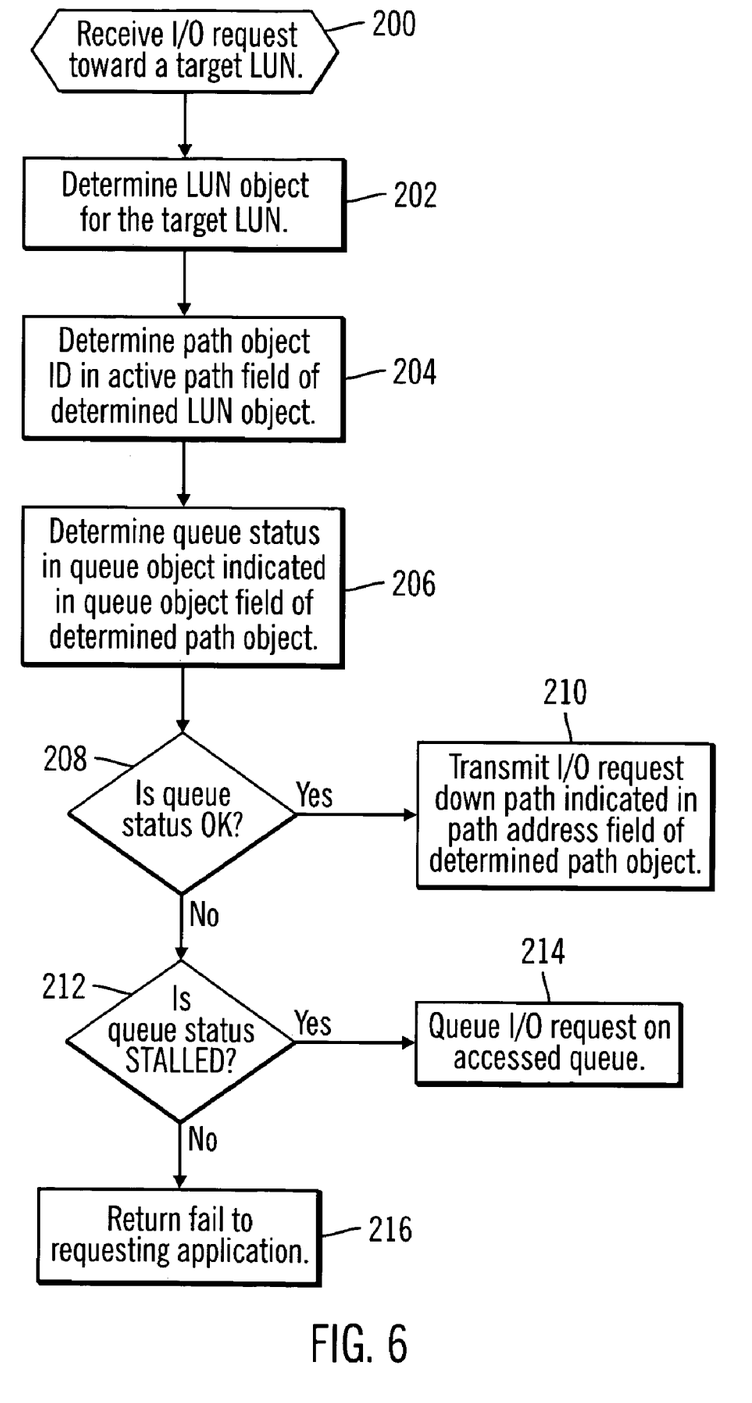
FIG. 6 illustrates logic to process Input/Output (I/O) requests in accordance with implementations of the invention.

FIG. 6 illustrates logic implemented in the device driver 14 to utilize the device driver objects 16 to manage I/O requests to a subcomponent, such as a LUN 8a, 8b . . . 8n in storage device 4. Control begins at block 200 upon receiving an I/O request from an application 10a, 10b . . . 10n directed toward a target LUN 8a, 8b . . . 8n. In response, the device driver 14 determines (at block 202) the LUN object 26a, 26b . . . 26n for the target LUN, i.e., the LUN object having a LUN ID field 74 (FIG. 4) matching the target LUN. The path object 28a, 28b indicated in the active path field 82 (FIG. 4) is determined (at block 204). Alternatively, if the target LUN can be accessed over any one of multiple paths, then one available path in the path list 80 would be selected. The device driver 14 then determines (at block 206) the queue status 34 in the queue object 22a, 22b . . . 22n indicated in queue object field 98 (FIG. 5) of the determined path object 28a, 28b. Alternatively, the queue object may be determined from the queue object field 58, 78 from the device object 50 or LUN object 70, respectively.

If (at block 208) the queue status is OK, then the device driver 14 transmits (at block 210) the I/O request to the target LUN 8a, 8b . . . 8n on the path indicated in the path address field 96 (FIG. 5) in the determined path object 28a, 28b. If (at block 212) the queue status is STALLED, such as the case during a failover or failback operation of the active path to the target LUN 8a, 8b . . . 8n, then the device driver 14 queues (at block 214) the received I/O request in the queue 20a, 20b . . . 20n indicated in the queue object 22a, 22b . . . 22n. Otherwise, if the queue status 34 is aborting, cancelling or deleted, then fail is returned (at block 216) to the requesting application 10a, 10b . . . 10n.

In implementations where the device does not include separately addressable subcomponents, e.g., LUNs, then the operations described as performed with respect to the LUN object 70 (FIG. 4) in FIG. 6 would be performed with respect to the device object 50 (FIG. 3b) to transmit the I/O request to the target device.

Figure 7:
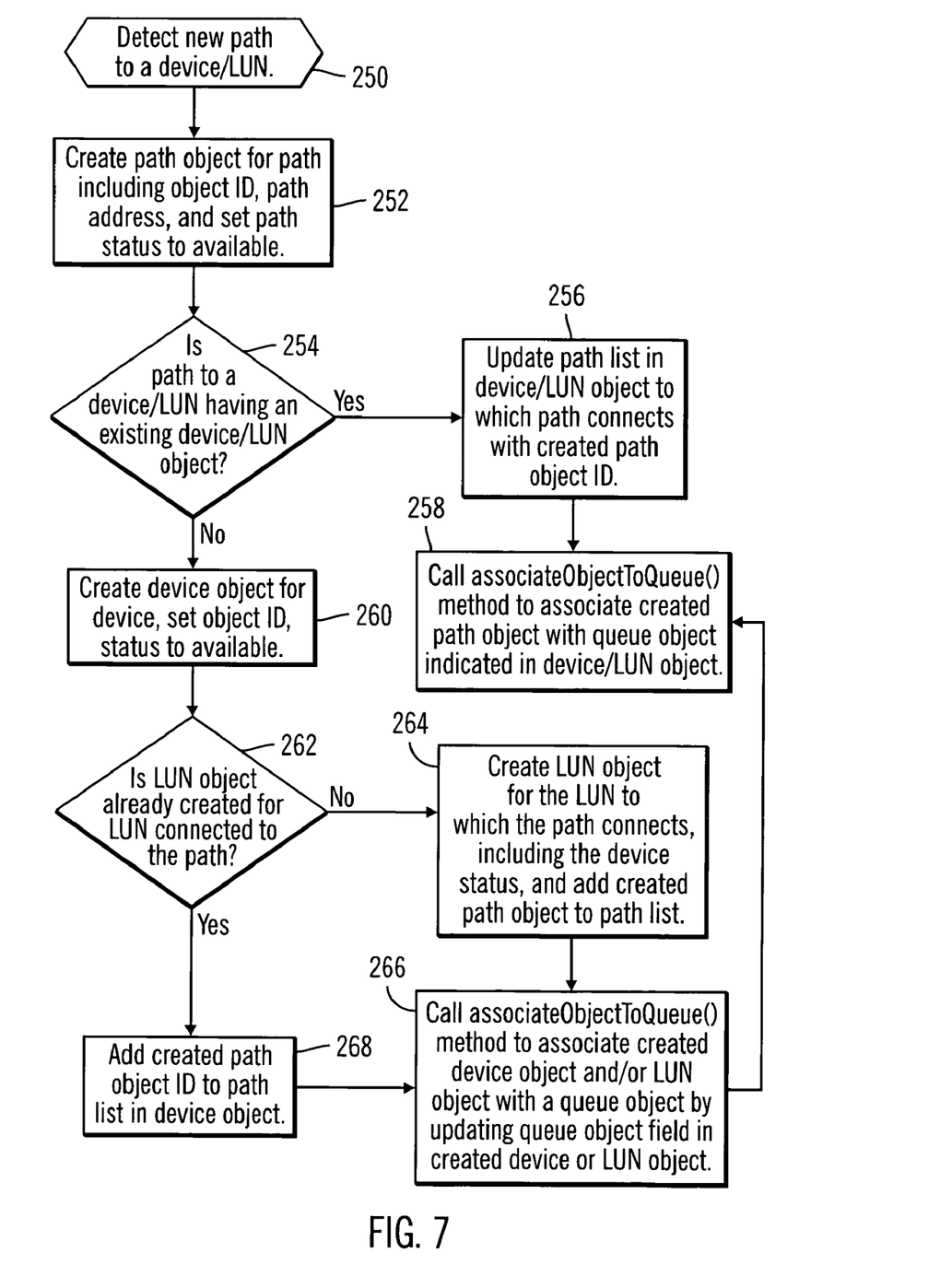
FIG. 7 illustrates logic to generate the objects used to manage paths to attached devices in accordance with implementations of the invention.

FIG. 7 illustrates logic implemented in the device driver 14 to generate the objects when detecting a new path to a device or subcomponent, e.g., LUN. Control begins at block 250 upon detecting the discovery of a path. This detection of the path may happen during an initialization at the host 2 when all paths are detected or a dynamic discovery during host 2 operations. In response, the device driver 14 would create (at block 252) a path object 28a, 28b for the detected path, and set the object ID 92 for the path, the path status 94 to available, the path address 96, and initialize pending I/O request count 100 to zero. If (at block 254) the detected path is to a target LUN/device for which there is an existing LUN/device object 50, 70 then the device driver 14 updates (at block 256) the path list 60, 80 in the existing LUN/device object 50, 70 with the created path object ID. The device driver 14 would further call (at block 258) the associateObjectToQueue( ) method to associate the created path object 28a, 28b with queue object 22a, 22b . . . 2n indicated in the device/LUN object.

If (at block 254) there is no existing LUN/device object 50, 70, then the device driver 14 creates (at block 260) a device object 40, 50 for the device at the end of the detected path, and sets the device status 46, 56 to available and the device ID 44, 54 with a unique identifier of the device. If (at block 262) LUN/device objects 50, 70 have not already been created for the LUN/device connected to this path, then the device driver 14 creates (at block 264) a LUN object 70 (FIG. 4) for the LUN 8a, 8b . . . 8n in the device 4 to which the path 6a, 6a connects, and sets the device status 76 to available and adds the ID of the created path object 28a, 28b to the path list 80. The device driver 14 would further call (at block 266) the associateObjectToQueue( ) method to update the queue object field 78 in the created LUN object 26a, 26b . . . 26n with a queue object 22a, 22b . . . 22n ID for a queue that 20a, 20b . . . 20n that will be used for the device/LUN. From block 266 control proceeds to block 258 to associate the path object with the device/LUN object at the end of the path defined by the path object. If (at block 262) LUN/device objects have been created, then the device driver 14 adds (at block 268) the path object ID of the created path object to the path list 60 of the created device object 50 (FIG. 3a). Control then proceeds to block 266 and 268 to complete updating the interrelationships.

After the initialization of one or all of the paths to one or more instances of a device type, the device driver for that device type is ready to handle I/O requests to the instances of the device type and other operations, such as the failover process described below.

Figure 8:
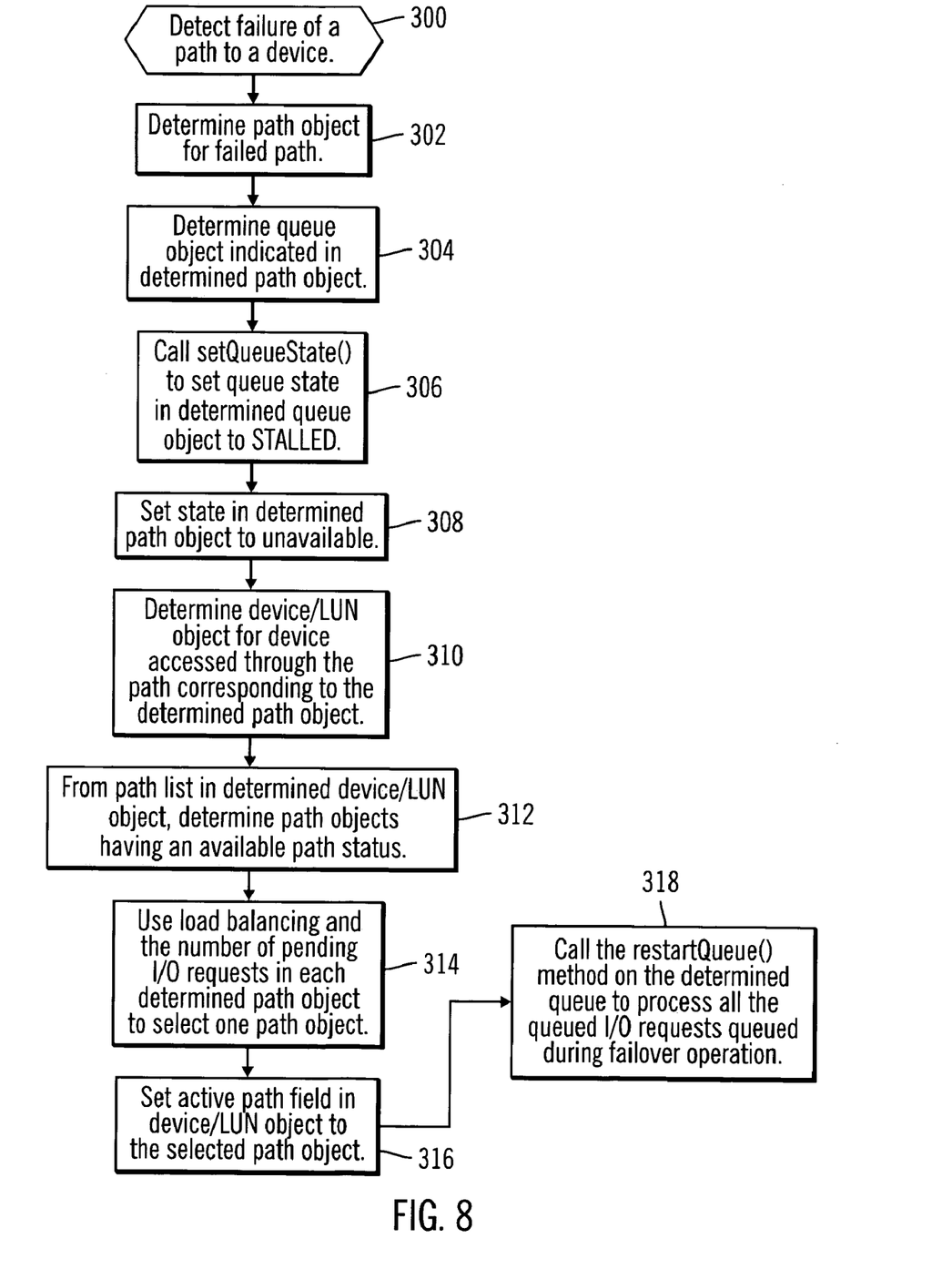
FIG. 8 illustrates logic to handle a failover of a path in accordance with implementations of the invention.

FIG. 8 illustrates logic implemented in the device driver 14 to perform a failover operation. At block 300, the device driver 14 detects a failover of a path 6a, 6a to the device 4 and, in response, determines (at block 302) the path object 28a, 28b for the detected path, i.e., the path object 90 having a path address field 96 matching the address of the failed path. The device driver 14 determines (at block 304) the queue object 22a, 22b . . . 22n indicated in the queue object field 98 (FIG. 5) of the determined path object 28a, 28b and calls (at block 306) the setQueueState( ) function to set the queue status field 34 in the determined path object 28a, 28b to STALLED. The device driver 14 further sets (at block 308) the path status field 94 in the determined path object 28a, 28b to unavailable. The device driver 14 then determines (at block 310) the device/LUN object 50, 70 for the device 4 on the failed path. The device driver 14 then determines (at block 312) from the path list 50, 70 in the determined device/LUN object 50, 70 the path objects for available paths to the device on the failed path. The device driver 14 then applies (at block 314) load balancing techniques known in the art and considers the pending I/O request count 100 in the determined available path objects 90 (FIG. 5) to select one available path object. Alternatively, a path object may be selected in a manner that does not involve load balancing. The active path field 82 in the device/LUN object 50, 70 for the device/LUN on the failed path is set (at block 316) to the selected path object for the new path to use to the device. For certain device types, the device driver 14 may issue failover related commands to the device 4 to configure the device to use the selected alternative path. At block 318, the device driver 14 would call the restartQueue( ) function with the determined queue object 22a, 22b . . . 22n for the queue 20a, 20b . . . 20n used during the failover to start processing all the I/O requests in the queue 20a, 20b . . . 20n indicated in the queue pointer 32 (FIG. 2) field of the determined queue object 22a, 22b . . . 22n.

A failback operation may be performed after a failed path 6a, 6a becomes available. The failback operation would involve many of the same steps in FIG. 8, except at the detection step at block 300, the availability of a previously down path is detected. Further, the now available path would be added to the path list 60, 80, and the path selection process at blocks 312 and 314, using load balancing or some other technique, would consider the previously failed path that is now available.

The described implementations provide techniques for managing multiple paths to devices by defining an object schema for the devices, subcomponents of the devices, e.g., LUNs, paths to the devices/LUNs, and queues for the devices/LUNs. In the described implementations, any number of queues may be used, where a path or device may be defined to share a queue or use different queues. Further, with the described implementations any of the device driver objects may be generated and destroyed dynamically during I/O operations as paths, queues, devices, LUNs, etc., are added or removed from attachment to the host 2.

ADDITIONAL IMPLEMENTATION DETAILS

The device and path management techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In certain implementations, the device being accessed comprises a storage device 4 having LUNs. Alternatively, the accessed device represented by a device object and associated with queue and path objects may comprise a storage device not having separately addressable LUNs or may be any type of I/O device known in the art, with or without separately addressable subcomponents.

In the described implementations, the management of the objects was performed by a device driver 14 managing access to the multiple paths to the devices. In alternative implementations, some or all of the operations described as performed by the device driver may be performed by other program components in the host, such as the applications or operating system.

With the described object schema, certain information was described as included in particular types of objects, e.g., device objects, LUN objects, queue objects, etc. In alternative implementations, information described as included in one object type may be included in a different object type.

The described FIG. 1 shows two paths to one device. However, the host may be connected to multiple devices and have one or more paths to each connected device.

The objects may comprise any data structure known in the art, included in volatile or non-volatile memory, such as a file, object, table, etc.

The logic of FIGS. 6-8 describes specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 9:
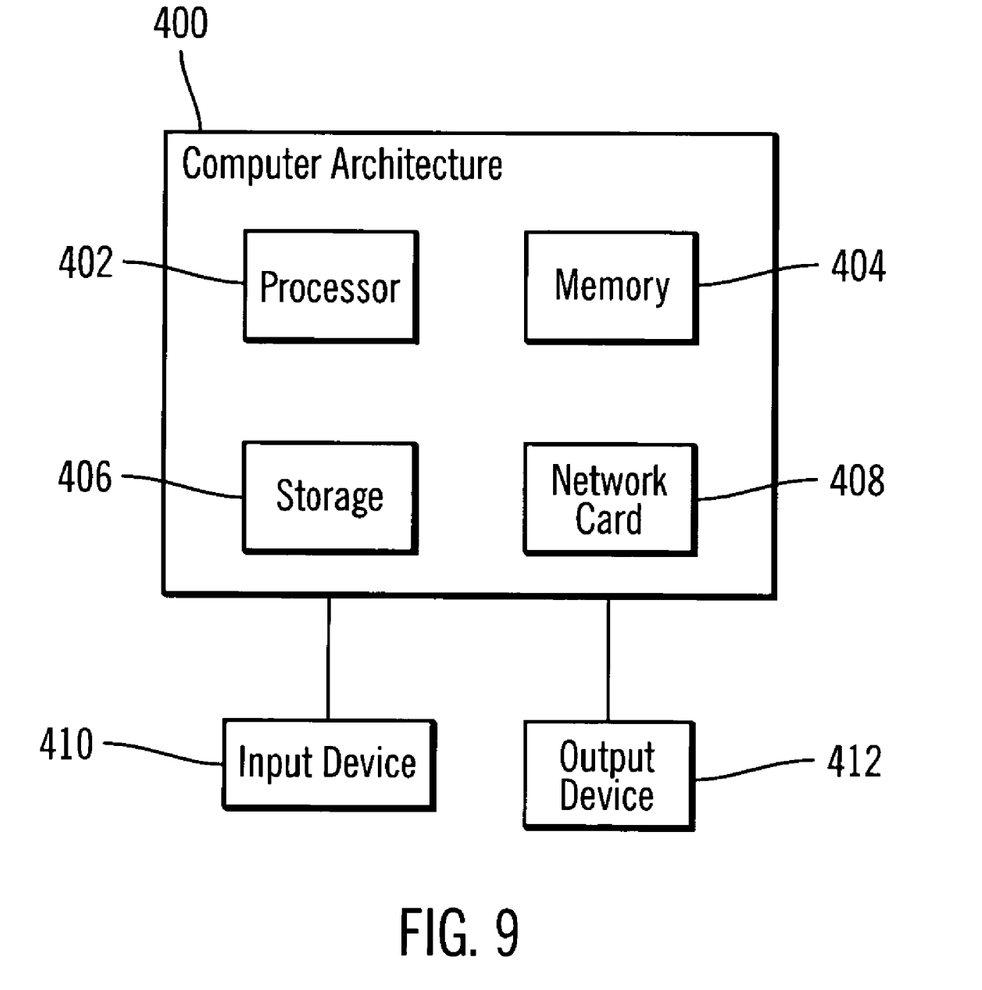
FIG. 9 illustrates a computer architecture that may be used with the systems shown in FIG. 1, such as the host and storage device, in accordance with certain implementations of the invention.

FIG. 9 illustrates one implementation of the architecture of the host 2. The system 2 may implement a computer architecture 400 having a processor 402 (e.g., a microprocessor), a memory 404 (e.g., a volatile memory device), and storage 406 (e.g., a non-volatile storage, such as magnetic disk drives, optical disk drives, a tape drive, etc.). The storage 4206 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 502, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended. The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for managing access to a device, comprising:
receiving an I/O request directed toward the device;
determining a device object for the device associated with at least one path object, wherein the path obiect provides information on one or more paths to the device;
determining a queue object associated with the device object, wherein the queue object corresponds to one queue;
determining a queue status from the determined queue object; and
transmitting the I/O request on a path indicated in the path object that is associated with the determined device object if the queue status is set to a state indicating to transmit I/O requests.

2. The method of claim 1, further comprising:
queuing the I/O request on the queue indicated in the determined queue object if the queue status is set to a state indicating to queue I/O requests.

3. The method of claim 1, wherein the device object comprises one of a plurality of separately addressable subcomponents of a higher level device, and wherein the received I/O request is directed to one of the separately addressable subcomponents of the higher level device.

4. The method of claim 3, wherein the higher level device is a storage device, and wherein the subcomponents comprise logical unit numbers (LUNs) of the storage device.

5. The method of claim 1, wherein one device object is provided for each instance of the device, and wherein different queue objects corresponding to different queues are associated with different device objects.

6. The method of claim 1, wherein different queue objects are capable of being associated with path objects corresponding to separate communication paths to the device, wherein the queue objects indicate different queues to use for I/O requests on the paths to the device.

7. The method of claim 1, wherein one queue object is associated with a plurality of path objects indicating separate communication paths to the device, wherein the queue object indicates one queue to use for I/O requests on the separate paths to the device.

8. The method of claim 1, wherein each path object is associated with the queue object indicated in the device object.

9. The method of claim 1, wherein the device objects, queue objects, and path objects may be created and destroyed while I/O requests are being directed to the device.

10. A system for managing access to a device, comprising:
a computer readable medium;
means for receiving an I/O request directed toward the device;
means for determining a device object in the computer readable medium for the device associated with at least one path object, wherein the oath obiect provides information on one or more paths to the device;
means for determining a queue object in the computer readable medium associated with the device object, wherein the queue object corresponds to one queue;
means for determining a queue status from the determined queue object; and
means for transmitting the I/O request on a path indicated in the path object that is associated with the determined device object if the queue status is set to a state indicating to transmit I/O requests.

11. The system of claim 10, further comprising:
means for queuing the I/O request on the queue indicated in the determined queue object if the queue status is set to a state indicating to queue I/O requests.

12. The system of claim 11, wherein one device object is provided for each instance of the device, and wherein different queue objects corresponding to different queues are associated with different device objects.

13. The system of claim 10, wherein one queue object in the computer readable medium is associated with a plurality of path objects indicating separate communication paths to the device, wherein the queue object indicates one queue to use for I/O requests on the separate paths to the device.

14. The system of claim 10, wherein the device objects, queue objects, and path objects may be created and destroyed while I/O requests are being directed to the device.

15. An article of manufacture for managing access to a device, wherein the article of manufacture causes operations to be performed, the operations comprising:
receiving an I/O request directed toward the device;
determining a device object for the device associated with at least one path object, wherein the path obiect provides information on one or more paths to the device,
determining a queue object associated with the device object, wherein the queue object corresponds to one queue;
determining a queue status from the determined queue object; and
transmitting the I/O request on a path indicated in the path object that is associated with the determined device object if the queue status is set to a state indicating to transmit I/O requests.

16. The article of manufacture of claim 15, further comprising:
queuing the I/O request on the queue indicated in the determined queue object if the queue status is set to a state indicating to queue I/O requests.

17. The article of manufacture of claim 15, wherein the device object comprises one of a plurality of separately addressable subcomponents of a higher level device, and wherein the received I/O request is directed to one of the separately addressable subcomponents of the higher level device.

18. The article of manufacture of claim 17, wherein the higher level device is a storage device, and wherein the subcomponents comprise logical unit numbers (LUNs) of the storage device.

19. The article of manufacture of claim 15, wherein one device object is provided for each instance of the device, and wherein different queue objects corresponding to different queues are associated with different device objects.

20. The article of manufacture of claim 15, wherein different queue objects are capable of being associated with path objects corresponding to separate communication paths to the device, wherein the queue objects indicate different queues to use for I/O requests on the paths to the device.

21. The article of manufacture of claim 15, wherein one queue object is associated with a plurality of path objects indicating separate communication paths to the device, wherein the queue object indicates one queue to use for I/O requests on the separate paths to the device.

22. The article of manufacture of claim 15, wherein each path object is associated with the queue object indicated in the device object.

23. The article of manufacture of claim 15, wherein the device objects, queue objects, and path objects may be created and destroyed while I/O requests are being directed to the device.

24. A computer readable medium including for handling Input/Output (I/O) requests to a device, wherein the computer readable medium includes at least two data structures comprising:
   a device object for the device;
   at least one path object associated with at least one device object, wherein the path object provides information on one or more paths to the device; and
   a queue object associated with the device object, wherein the queue object corresponds to one queue and indicates a queue status, wherein one I/O request directed to the device is transmitted on a path indicated in the path object that is associated with the device object for the device if the queue status indicated in the queue object associated with the device object for the device is set to a state indicating to transmit I/O requests.

25. The computer readable medium of claim 24, wherein the I/O request is queued on the queue indicated in the determined queue object if the queue status is set to a state indicating to queue I/O requests.

26. The computer readable medium of claim 24, wherein one device object is provided for each instance of the device, and wherein different queue objects corresponding to different queues are associated with different device objects.

27. The computer readable medium of claim 24, wherein one queue object is associated with a plurality of path objects indicating separate communication paths to the device, wherein the queue object indicates one queue to use for I/O requests on the separate paths to the device.

28. A computer readable medium for handling a failover on one of a plurality of paths to a device, wherein the computer readable medium comprising:
   at least one path object for a failed path, wherein one path object is provided for each path to the device;
   a device object for the device;
   a queue associated with a device object for the device;
   a queue state for the queue, wherein the queue state is capable of being set to indicate that I/O requests directed to the device are to be added to the queue, and wherein a determination is made of one alternative path object associated with an alternative available path to the device from a plurality of path objects associated with the device object for the device.

29. The computer readable medium of claim 28, further comprising:
   a path list indicating a plurality of path objects associated with the device object, wherein the determined alternative path object is determined from the path list.

30. The computer readable medium of claim 29, wherein each path object indicates a number of pending I/O requests on the path associated with the path object, and wherein the indicated number of pending I/O requests are used by a load balancing routine to select the path object corresponding to the path having a lowest load based on the pending I/O requests indicated in the path objects.

31. The computer readable medium of claim 28, wherein one queue object is indicated in each device object, wherein the queue is determined from the queue object indicated in the device object, wherein the queue state is indicated in the queue object, and wherein a location of the queue in the computer readable medium is indicated in the queue object.

* * * * *

UNITED STATES PATENT AND TRADEMARK OFFICE
CERTIFICATE OF CORRECTION

PATENT NO. : 7,275,084 B2
APPLICATION NO. : 10/156977
DATED : September 25, 2007
INVENTOR(S) : Stephen D. Paul It is certified that error appears in the above-identified patent and that said Letters Patent is hereby corrected as shown below:

In claim 1, column 9, line 27, "obiect" should read --object--.

In claim 10, column 10, line 11, "oath obiect" should read --path object--.

In claim 15, column 10, line 45, "obiect" should read --object--.

In claim 24, column 11, line 32, "obiect" should read --object--.

Signed and Sealed this

Twenty-seventh Day of November, 2007

JON W. DUDAS
*Director of the United States Patent and Trademark Office*